Jan. 8, 1963  E. W. GORTER ET AL  3,072,575
FERROMAGNETIC BODY AND METHOD OF MAKING THE SAME
Filed May 12, 1958  13 Sheets-Sheet 7
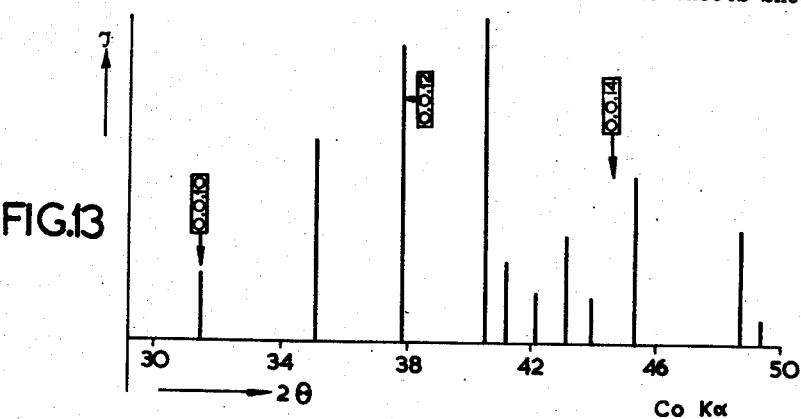
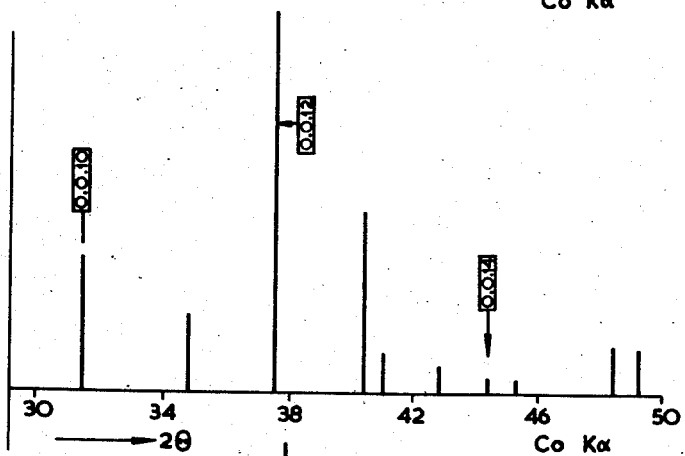
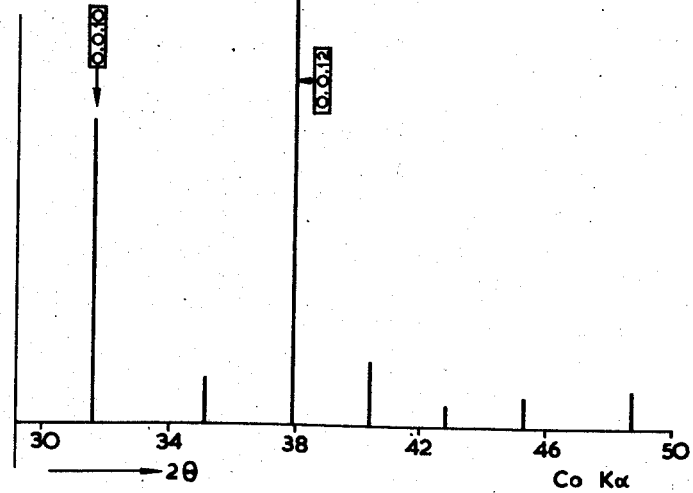
INVENTOR
EVERT WILLEM GORTER
FREDERIK KAREL LOTGERING
GERARD HEINRICH JONKER
HENRICUS PETRUS JOHANNES WIJN
BY  CORNELIS KOOY
AGENT Jan. 8, 1963 E. W. GORTER ET AL 3,072,575
FERROMAGNETIC BODY AND METHOD OF MAKING THE SAME
Filed May 12, 1958 13 Sheets-Sheet 10

INVENTOR
EVERT WILLEM GORTER
FREDERIK KAREL LOTGERING
GERARD HEINRICH JONKER
HENRICUS PETRUS JOHANNES WIJN
BY CORNELIS KOOY

AGENT

Jan. 8, 1963 E. W. GORTER ET AL 3,072,575
FERROMAGNETIC BODY AND METHOD OF MAKING THE SAME
Filed May 12, 1958 13 Sheets-Sheet 11
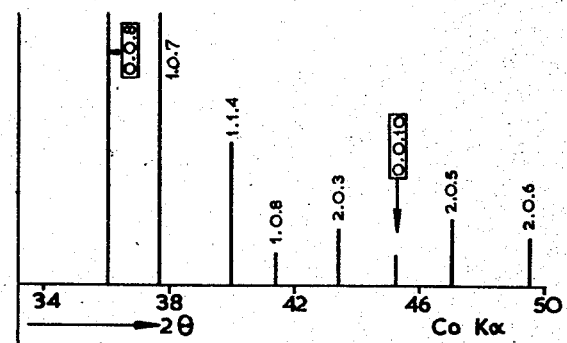
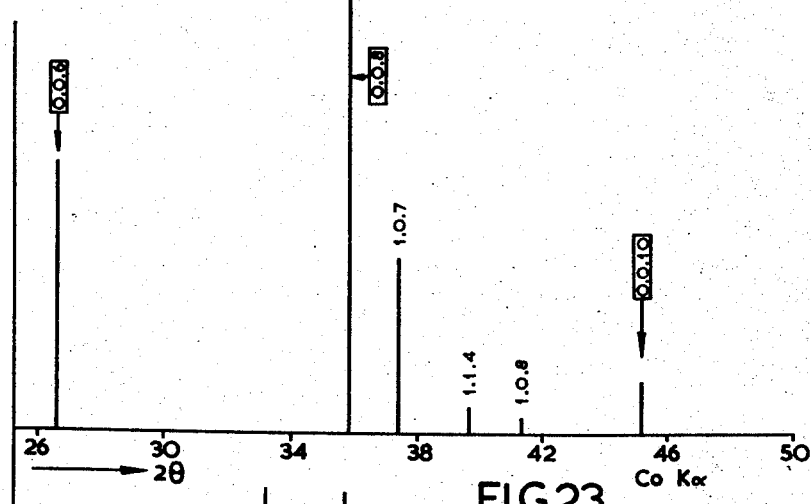
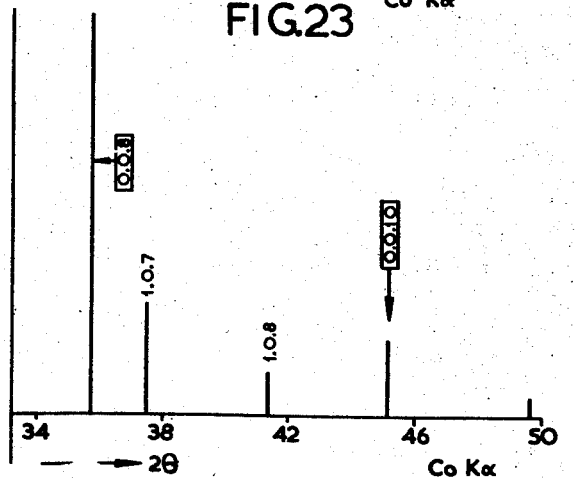
INVENTOR
EVERT WILLEM GORTER
FREDERIK KAREL LOTGERING
GERARD HEINRICH JONKER
HENRICUS PETRUS JOHANNES WIJN
BY CORNELIS KOOY
AGENT United States Patent Office 3,072,575
Patented Jan. 8, 1963

3,072,575
FERROMAGNETIC BODY AND METHOD OF MAKING THE SAME
Evert Willem Gorter, Frederik Karel Lotgering, Gerard Heinrich Jonker, Henricus Petrus Johannes Wijn, and Cornelis Kooy, Eindhoven, Netherlands, assignors to North American Philips Company, Inc., New York, N.Y., a corporation of Delaware
Filed May 12, 1958, Ser. No. 734,727
Claims priority, application Netherlands May 13, 1957
17 Claims. (Cl. 252—62.5)

Our invention relates to a ferromagnetic body and method of manufacturing the same. More particularly, the invention relates to ferromagnetic bodies constituted of oxidic materials which have been suitably oriented to be magnetically anisotropic.

Various ferromagnetic oxidic materials are known, of some of which the monocrystals exhibit a preferential direction of magnetization and these materials can thus be formed into permanent anisotropic magnets. Such magnets exhibit the advantage that their energy-products-$(BH)_{max}$ are greater than those of isotropic magnets formed of the same material.

The monocrystals of some ferromagnetic oxidic materials exhibit a preferential plane of magnetization, that is, the direction of magnetization is more readily rotatable in a plane than in a direction which does not lie in this plane. These materials can be formed into anisotropic soft magnetic bodies. Such bodies exhibit the advantage that the initial permeability $\mu_0$ is greater than that of isotropic bodies formed of the same material.

In either case, it is usual to form the material as an isotropic ferromagnetic material first and then orient the material while in a finely-divided or comminuted form by placing the material in a magnetic field so that the particles are aligned by the magnetic field. The so oriented material can then be compacted into a body and sintered to give the body coherency.

In the case of a material the monocrystals of which exhibit a preferential plane of magnetization, it has been found advisable to employ, in orienting the material, a magnetic field which rotates, i.e. if the field is considered as represented by a vector, the vector is said to rotate, giving the effect of a rotating field.

The present invention pertains to an improved and simplified process for making anisotropic ferromagnetic bodies constituted of ferromagnetic oxidic materials. Thus, in accordance with our invention, we have found that the so-called starting mixture may consist of a plurality of oxidic components, one of which need only be ferromagnetic and capable of being magnetically "oriented," i.e. in a preferred direction or plane. This component will hereinafter be referred to as the "directionable component." Thus, this directionable component can be oriented by a magnetic field, while still in a mobile state. After orientation, the mixture now containing a highly-oriented component can be compacted and sintered. During sintering, chemical reactions occur in which new materials are formed which are ferromagnetic and are also oriented so that anisotropic ferromagnetic bodies are formed.

Preferably the mixture contains a smallest possible number of conglomerations of the directionable component which are not monocrystals, since the envisaged effect becomes manifest more strongly as a larger proportion of the particles of the directionable component contains only one crystal orientation.

It is important for the magnetic field to be homogeneous, since a strongly inhomogeneous magnetic field could lead to de-mixing of the finely-divided initial mixture, with the result that complete conversion into the new material cannot take place during sintering.

The magnetic field need not be stationary, but its intensity may be varied during the orientation of the particles of the directionable component. If the directionable component is built up of crystals having a preferential plane of magnetization, the direction of the magnetic field may also be varied during treatment. In this case, particularly good results are obtained with a magnetic field which rotates. If the crystals of the directionable component have a preferential direction of magnetization, use is made of a stationary magnetic field or at least a field, the direction of which does not vary.

In order to decide whether the monocrystals of the directionable component exhibit a preferential direction or preferential plane of magnetization use may be made of the following identification test:

A small amount, for example 25 mgs. of the crystal material to be examined is mixed as a fine powder with a few drops of a solution of an organic binder or adhesive in acetone, the mixture being spread on a glass slide. This slide is arranged between the poles of an electromagnet so that the lines of magnetic force are at right angles to the surface of the slide. By gradually increasing the electric direct-current of the electromagnet, the magnetic field strength is increased, so that the powder particles rotate in the field in a manner such that either the preferential direction or the preferential plane of magnetization becomes substantially parallel to the direction of the lines of magnetic force. By proceeding carefully, coagulation of the powder particles can be avoided. After evaporation of the acetone, the powder particles adhere to the glass surface in a magnetically oriented condition. By taking an X-ray diffractometer photograph it can now be determined which orientation of the powder particles has been produced by the action of the magnetic field; if the ratios between the intensities of the reflections at the crystal surfaces which are at right angles to one crystal direction and the intensities of the reflections at the other crystal surfaces in an oriented specimen are higher than the corresponding ratios in a non-oriented specimen the monocrystals exhibit a preferential direction of magnetization; if the ratios between the intensities of the reflections at the crystal surfaces appertaining to a single zone and the intensities of the reflections at the crystal surfaces not appertaining to said zone, in an oriented specimen are higher than the corresponding ratios in a non-oriented specimen the monocrystals exhibit a preferential plane of magnetization.

Ferromagnetic oxidic materials exhibiting a preferential direction of magnetization are, for example $BaFe_{12}O_{19}$, $Ba_3Mg_2Fe_{24}O_{41}$, $BaNi_2Fe_{16}O_{27}$ and $CoFe_2O_4$. Those exhibiting a preferential plane of magnetization are, for example $Ba_3Co_3Fe_{24}O_{41}$, $Ba_2Zn_2Fe_{12}O_{22}$ and $BaCo_2Fe_{16}O_{27}$. The starting mixture may contain one or more of these components in addition to other metal oxides or compounds which decompose upon heating to form oxides such as acetates, carbonates, nitrates, oxalates, etc., and which, in addition, will react to form other ferromagnetic oxidic compounds such as those to be described hereinafter. If the mixture contains more than one, such component it is preferable that all such components exhibit either a preferential direction or a preferential plane of magnetization.

To determine whether a body made in accordance with the invention is indeed an anisotropic body, an X-ray diffractometer photograph is taken of the body and compared to a body in which the material has not been oriented.

For example, in the case of a material having a hexagonal crystal structure, an X-ray diffractometer photograph taken of a surface of a body, made according to the invention, at right angles to the direction in which the hexagonal c-axis of the particles of the directionable component is placed during the directing process, the ratios between the intensities of the reflections at the crystal surface which are at right angles to the hexagonal c-axis, and the intensities of the reflections at the other crystal surfaces, are higher in the body manufactured according to the invention than the corresponding ratios in the body manufactured without the method according to the invention. An X-ray diffractometer photograph taken of a surface parallel to the direction in which the hexagonal c-axis of the particles of the directionable component is placed during the directing process, shows that the ratios between the intensities of the reflections at the crystal surfaces appertaining to the zone of the hexagonal c-axis, and the intensities of the reflections at the crystal surfaces not appertaining to this zone are higher in the body manufactured by the method according to the invention than the corresponding ratios in the body manufactured without the method according to the invention.

It is significant to note that in the process according to the invention, the final composition, although oriented, is completely different from the directionable component. That is, the final composition can differ either in composition, crystal structure, or both, from the directionable component and yet be oriented as a result of the initial orientation of the directionable component. The monocrystals of the directionable component and of the final composition both may exhibit a preferential direction or preferential plane of magnetization, but also one may exhibit a preferential direction and the other a preferential plane the latter possibility pertaining to a simplified process for making anisotropic ferromagnetic bodies, especially when the monocrystals of the directionable component exhibit a preferential direction of magnetization and those of the final component exhibit a preferential plane of magnetization.

Examples of constitutive materials of bodies which may be manufactured by the method according to the invention are inter alia:

(a) Materials having a composition of

8–21 mol percent of AO
5–21 mol percent of MeO
58–83 mol percent of $Fe_2O_3$ wherein A represents at least one of the bivalent metals Ba, Sr, Pb, Ca and Me represents at least one of the bivalent metals Fe, Mn, Co, Ni, Zn, Mg, Cu or the bivalent complex $$\frac{Li^+ + Fe^{+++}}{2}$$

Included therein are the following groups of materials, the particles of each group having the same crystal structure:

(b) Materials consisting of crystals and/or mixed crystals of compounds with the formula $AMe_2Fe_{16}O_{27}$, wherein A represents at least one of the bivalent metals Ba, Sr, Pb and for at most ⅔ part Ca and wherein Me represents at least one of the bivalent metals Fe, Mn, Co, Ni, Zn, Mg or the bivalent complex $$\frac{Li^+ + Fe^{+++}}{2}$$

(c) Materials consisting of crystals and/or mixed crystals of compounds with the formula $A_3Me_2Fe_{24}O_{41}$, wherein A represents Ba, for at most ⅓ part Sr, for at most ⅕ part Pb and/or for at most ⅒ part Ca and wherein Me represents at least one of the bivalent metals Fe, Mn, Co, Ni, Zn, Mg, Cu or the bivalent complex $$\frac{Li^+ + Fe^{+++}}{2}$$

(d) Materials consisting of crystals and/or mixed crystals or compounds with the formula $A_2Me_2Fe_{12}O_{22}$, wherein A represents Ba, for at most one half Sr, for at most one quarter Pb and/or for at most one quarter Ca and wherein Me represents at least one of the bivalent metals Fe, Mn, Co, Ni, Zn, Mg and Cu.

(e) Materials consisting of crystals and/or mixed crystals of compounds with the formula $A_4Me_2Fe_{36}O_{60}$, wherein A represents Ba, for at most ⅓ part Sr, for at most ⅕ part Pb and/or for at most ⅒ part Ca and wherein Me represents at least one of the bivalent metals Fe, Co, Ni, Zn, Mg and for at most ³⁄₁₀ part Mn or Cu.

(f) Materials consisting of crystals and/or mixed crystals of compounds with the formula $A_2Me_2Fe_{28}O_{46}$, wherein A represents at least one of the bivalent metals Ba, Sr, Pb and for at most ⅔ part Ca and wherein Me represents at least one of the bivalent metals Fe, Mn, Co, Ni, Mg or the bivalent complex $$\frac{Li^+ + Fe^{+++}}{2}$$

It is also possible by the method according to the invention to manufacture bodies consisting of (g) Materials consisting of mixed crystals of compounds with the formula $$ACo_a^{II} Ti_a^{IV} Fe_{(12-2a)}^{III} O_{19}$$

wherein A represents at least one of the bivalent metals Ba, Sr, Pb and for at most ⅔ part Ca and Ca and $a$ having a value between 1.0 and 1.6.

The method according to the invention is also applicable to the manufacture of bodies consisting of crystals with spinel structure. Two different cases then occur.

In one case, the directionable component of the initial mixture is a compound with hexagonal crystal structure. Sintering the initial mixture, which has been given the shape desired for the body, results in crystals with spinel structure being formed, but during this reaction, crystals of one or more other compounds, which are not ferromagnetic, are formed at the same time and these compounds are thus present in the body as contaminations.

In the other case, the directionable component of the initial mixture is $CoFe_2O_4$ and the body manufactured by the method is only built up of particles with spinel structure.

The invention will be described with reference to the accompanying drawing in which:

FIG. 13 is a diffractometer photograph of a body consisting of crystals of $BaFe_2^{++}Fe_{16}^{+++}O_{27}$ not made according to the invention;

FIGS. 14, 15, 16, 17, 18 and 19 are diffractometer photographs of bodies constituted of materials whose crystal structures are comparable to $BaFe_2^{++}Fe_{16}^{+++}O_{27}$ and which have been made according to the invention;

FIGS. 21, 22, 23 and 24 are diffractometer photographs of bodies having a crystal structure which is similar to that of $BaFe_{12}O_{19}$ but made in accordance with the invention;

FIG. 26 is an X-ray diffractometer photograph of a surface of a body constituted of a material similar to that of which FIG. 25 is an X-ray diffractometer photograph but made in accordance with the invention.

FIG. 28 is an X-ray diffractometer photograph of a surface of a body constituted of a material to that of which FIG. 27 is an X-ray diffractometer photograph but made in accordance with the invention.

*Example I*

A mixture constituting of $BaFe_{12}O_{19}$, $BaCO_3$, $ZnO$ and $CoCO_3$ in a ratio of 2 molecules of $BaFe_{12}O_{19}$, 1 molecule of $BaCO_3$, 1.4 molecules of $ZnO$ and 0.6 molecules of $CoCO_3$, which corresponds to the desired compound $Ba_3Zn_{1.4}Co_{0.6}Fe_{24}O_{41}$, was ground with alcohol in a shaking mill for 8 hours. $BaFe_{12}O_{19}$ is the directionable component of this initial mixture and the crystals of this compound have a preferred direction of magnetization parallel to the hexagonal $c$-axis. The ground product was suspended in acetone and a portion thereof was molded into a small block at a pressure of about 1 ton/cm.$^2$ in a direct magnetic field having a constant field strength of 7500 oersteds at right angles to the direction of molding. The term "direct magnetic field" is to be understood to mean a magnetic field, the direction of which does not vary. The block was heated from room temperature to 500° C. within 16 hours and from 500° C. to 1250° C. within 5 hours and heated in oxygen at 1250° C. for 16 hours. The reaction may be represented by the equation

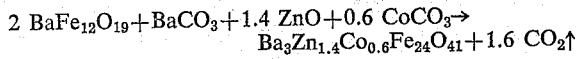

$$2\ BaFe_{12}O_{19} + BaCO_3 + 1.4\ ZnO + 0.6\ CoCO_3 \rightarrow Ba_3Zn_{1.4}Co_{0.6}Fe_{24}O_{41} + 1.6\ CO_2\uparrow$$

An X-ray diffractometer photograph (FIG. 2) was taken of a surface of this block which was at right angles to the direction of the direct field during molding.

For comparison purposes an X-ray diffractometer photograph (FIG. 1) was taken of a surface of a body built up of crystals of the compound $Ba_3Co_2Fe_{24}O_{41}$ and manufactured without the use of a directing process. The constitutive particles of this body have the same crystal structure as those of the body manufactured by the method according to the invention, so that comparison is justified.

Figure 1:
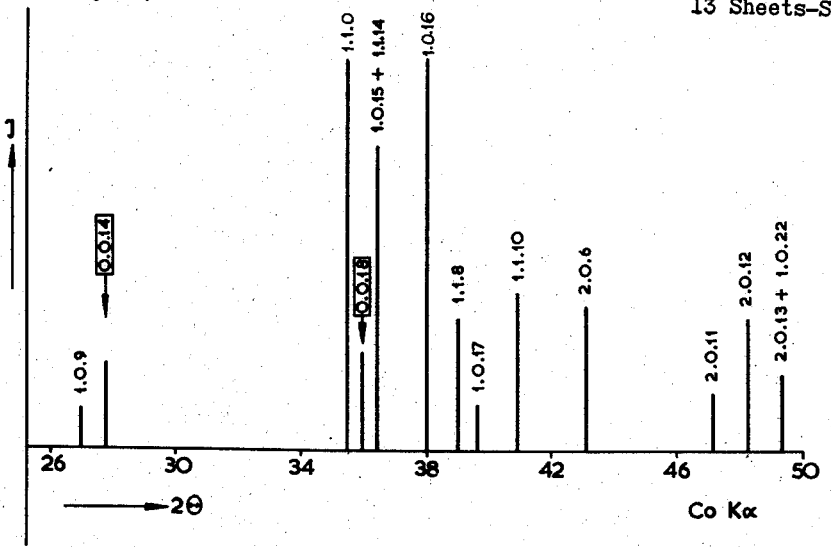
FIG. 1 is a diffractometer photograph showing the relative intensities of the reflections of $CoK\alpha$ radiation in an arbitrary unit as a function of the angle of deflection $2\theta$ of a surface of a body not manufactured according to the invention to serve as a standard of comparison.
Figure 2:
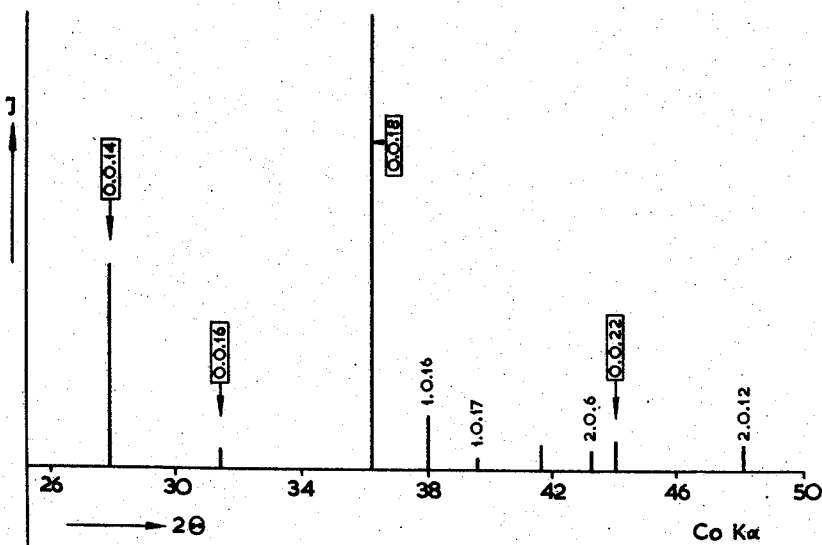
FIGS. 2 to 10 are similar diffractometer photographs taken under similar conditions of bodies of comparable materials made according to the invention.

Comparison of FIGURES 1 and 2 shows the ratios of the intensities of the reflections of the crystal surfaces which are at right angle to the hexagonal $c$-axis of the crystals, to the intensities of the reflections of the other crystal surfaces, are higher in FIG. 2 than in FIG. 1.

*Example II*

In the manner described in Example I, a small block was manufactured from an initial mixture of $BaFe_{12}O_{19}$, $Ba_3Zn_2Fe_{24}O_{41}$, $CoCO_3$ and $BaCO_3$ according to the equation

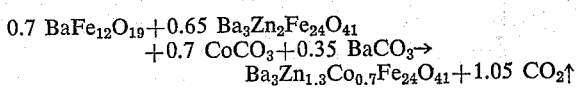

$$0.7\ BaFe_{12}O_{19} + 0.65\ Ba_3Zn_2Fe_{24}O_{41} + 0.7\ CoCO_3 + 0.35\ BaCO_3 \rightarrow Ba_3Zn_{1.3}Co_{0.7}Fe_{24}O_{41} + 1.05\ CO_2\uparrow$$

Figure 3:
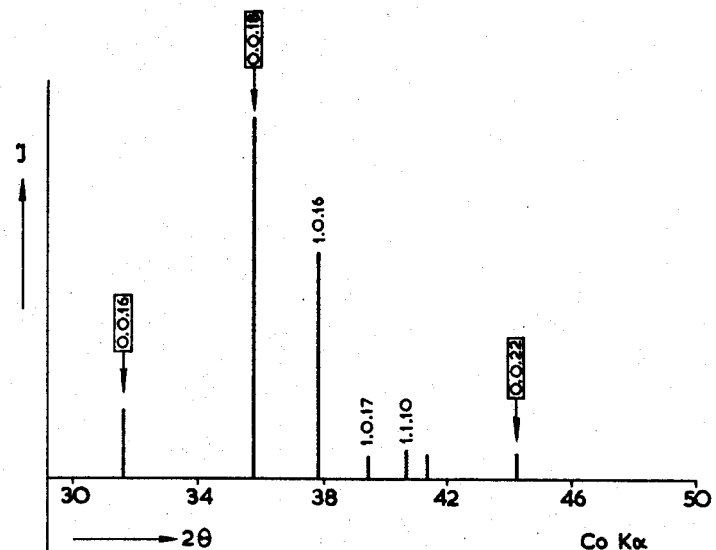

$BaFe_{12}O_{19}$ and $Ba_3Zn_2Fe_{24}O_{41}$ are the directionable components of the initial mixture and the crystals of these compounds have a preferred direction of the magnetization parallel to the hexagonal $c$-axis. The X-ray diffractometer photograph taken of a surface of this block at right angles to the direction of the direct field during molding is shown in FIG. 3. The crystal structure of the particles, of which this body is built up, is identical with that of the crystals of the compound $Ba_3Co_2Fe_{24}O_{41}$, so that FIG. 3 may be compared with FIG. 1. From this comparison it appears that the ratios of the intensities of the reflections of the crystal surfaces parallel to the hexagonal $c$-axis of the crystals, to the intensities of the reflections of the other crystal surfaces are higher in FIG. 3 than in FIG. 1.

Furthermore, a cube was cut from this block. The value for the initial permeability of this cube was determined at a frequency 2 kcs./sec. in relatively perpendicular directions, use being made of a calibrated ferrite yoke. In the direction of the direct field during the manufacture of the block, $\mu_0 = 14$, whereas in the directions at right angles thereto $\mu_0 = 40$.

*Example III*

A small block was manufactured from a mixture consisting of $BaFe_{12}O_{19}$, $Ba_3Zn_2Fe_{24}O_{41}$, $CoCO_3$ and $BaCO_3$ according to the equation

Figure 4:
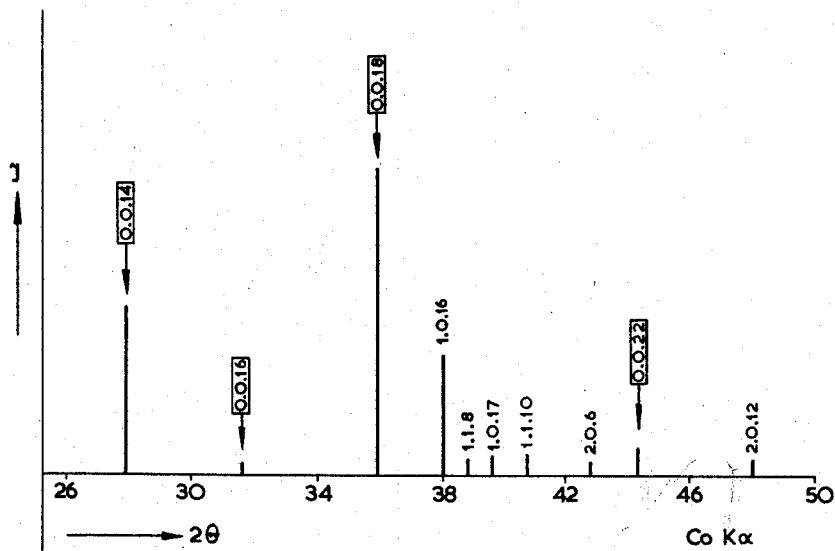

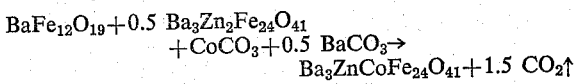

$$BaFe_{12}O_{19} + 0.5\ Ba_3Zn_2Fe_{24}O_{41} + CoCO_3 + 0.5\ BaCO_3 \rightarrow Ba_3ZnCoFe_{24}O_{41} + 1.5\ CO_2\uparrow$$

in the manner described in Example I, except that only the block was heated at 1250° C. in oxygen for 3 hours. $BaFe_{12}O_{19}$ and $Ba_3Zn_2Fe_{24}O_{41}$ are the directionable components of the initial mixture and the crystals of the compounds have a preferred direction of magnetization parallel to the hexagonal $c$-axis. The X-ray diffractometer photograph taken of a surface of this block at right angles to the direction of the direct field during molding is shown in FIG. 4. The crystal structure of the particles of which this body is built up is identical with that of the crystals of the compound $Ba_3Co_2Fe_{24}O_{41}$, so that FIG. 4 may be compared with FIG. 1. From this comparison it appears that the ratios of the intensities of the reflections of the crystal surfaces at right angles to the hexagonal $c$-axis of the crystals, to the intensities of the reflections of the other crystal surfaces are higher in FIG. 4 than in FIG. 1.

Furthermore a cube was cut from this block, the values of the initial permeability of which were determined at 2 kcs./sec. in a calibrated ferrite yoke. In the direction of the direct field during the manufacture of the block $\mu_0 = 55$, whereas in the directions at right angles thereto 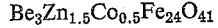 $\mu_0 = 31.5$ and $\mu_0 = 32.5$.

*Example IV*

A mixture consisting of $Ba_3Zn_2Fe_{24}O_{41}$, $BaCO_3$, $CoCO_3$ and $Fe_2O_3$ in a ratio of 0.75 mol of $Ba_3Zn_2Fe_{24}O_{41}$, 0.75 mol of $BaCO_3$, 0.5 mol of $CoCO_3$ and 3 mols of $Fe_2O_3$, which corresponds to the desired compound $$Be_3Zn_{1.5}Co_{0.5}Fe_{24}O_{41}$$

was ground with alcohol in a shaking mill for 8 hours. $Ba_3Zn_2Fe_{24}O_{41}$ is the directionable component of the initial mixture and the crystals of this compound have a preferred direction of the magnetization parallel to the hexagonal $c$-axis. The ground product was suspended in acetone and a portion thereof was molded into a tablet at a pressure of about 1 ton/cm.$^2$ in a direct field having a constant field strength of 8000 oersteds parallel to the direction of molding. The tablet was heated from room temperature to 500° C. within 1.5 hours and from 500° to 1250° C. within 5 hours and heated in oxygen at 1250° C. for 16 hours. The reaction may be represented by the equation

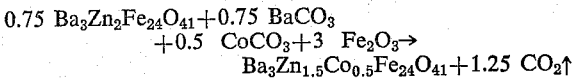

$$0.75\ Ba_3Zn_2Fe_{24}O_{41} + 0.75\ BaCO_3 + 0.5\ CoCO_3 + 3\ Fe_2O_3 \rightarrow Ba_3Zn_{1.5}Co_{0.5}Fe_{24}O_{41} + 1.25\ CO_2\uparrow$$

Figure 5:
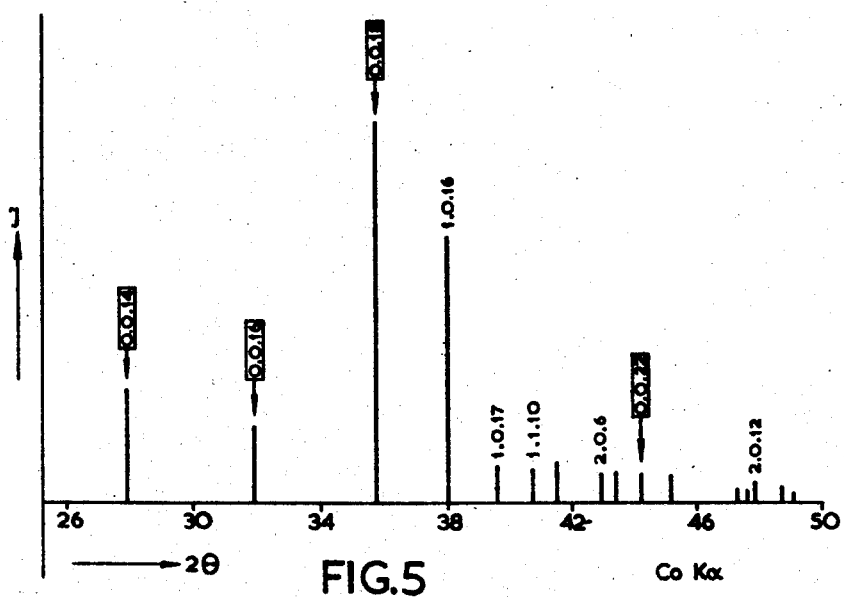

An X-ray diffractometer photograph taken of a surface of this tablet at right angles to the direction of molding is shown in FIG. 5. The crystal structure of the particles, of which this body is built up, is identical with that of the crystals of the compound $Ba_3Co_2Fe_{24}O_{41}$, so that FIG. 5 may be compared with FIG. 1. From this comparison it appears that the ratios of the intensities of the reflections of the crystal surfaces at right angles to the hexagonal c-axis of the crystals, to the intensities of the reflections of the other crystal surfaces are higher in FIG. 5 than in FIG. 1.

*Example V*

In the manner described in Example I, a small block was manufactured from an initial mixture consisting of $Ba_3Zn_2Fe_{24}O_{41}$, $BaCO_3$, $CoCO_3$ and $Fe_2O_3$ according to the equation

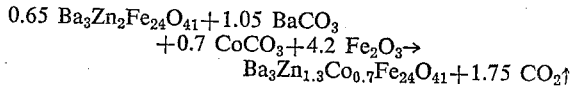

Figure 6:
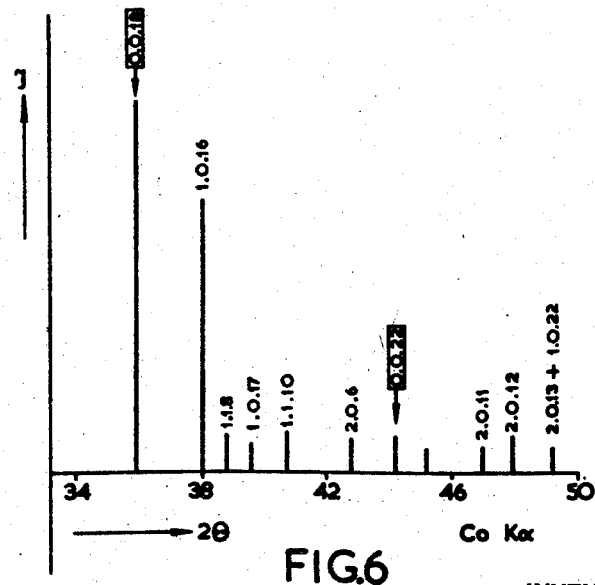

$Ba_3Zn_2Fe_{24}O_{41}$ is the directionable component of the initial mixture and the crystals of these compounds have a preferred direction of the magnetization parallel to the hexagonal c-axis. The X-ray diffractometer photograph taken of a surface of this block at right angles to the direction of the direct field during molding is shown in FIG. 6. The crystal structure of the particles of which this body is built up is identical with that of the crystals of the compound $Ba_3Co_2Fe_{24}O_{41}$, so that FIG. 6 may be compared with FIG. 1. From this comparison it appears that the ratios of the intensities of the reflections of the crystal surfaces at right angles to the hexagonal c-axis of the crystals, to the intensities of the reflections of the other crystal surfaces are higher in FIG. 6 than in FIG. 1.

Furthermore, a cube was cut from this block, the values for the initial permeability of which were determined at 2 kcs./sec. in a calibrated ferrite yoke. In the direction of the direct field during the manufacture of the block, $\mu_0=10$, whereas in the directions at right angles thereto $\mu_0=41$.

*Example VI*

In the manner described in Example III, a small block was manufactured from an initial mixture consisting of $Ba_3Zn_2Fe_{24}O_{41}$, $BaCO_3$, $CoCO_3$ and $Fe_2O_3$ according to the equation

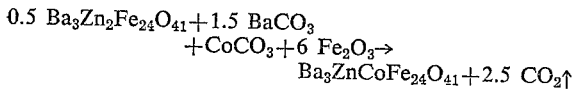

Figure 7:
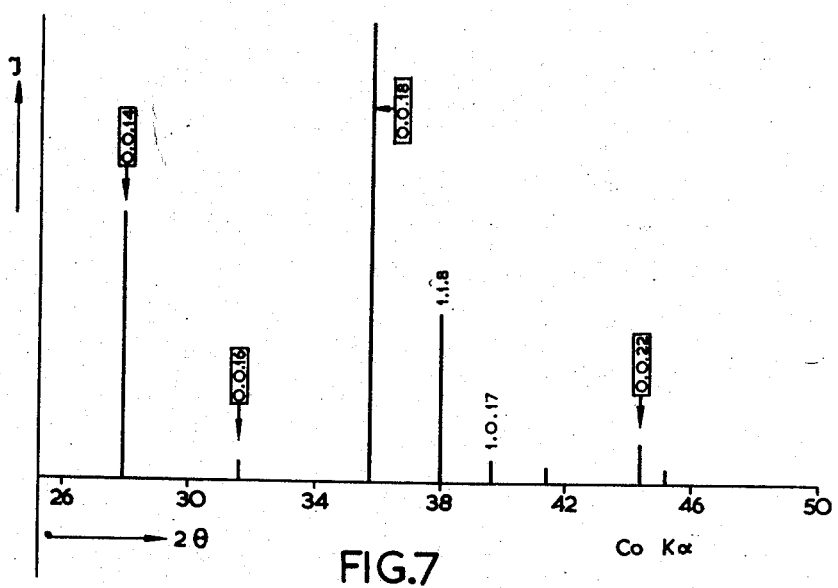

$Ba_3Zn_2Fe_{24}O_{41}$ is the directionable component of the initial mixture and the crystals of this compound have a preferred direction of magnetizaiton parallel to the hexagonal c-axis. The X-ray diffractometer photograph taken of a surface of this block at right angles to the direction of the direct field during molding is shown in FIG. 7. The crystal structure of the particles of which this body is built up is identical with that of the crystals of the compound $Ba_3Co_2Fe_{24}O_{41}$, so that FIG. 7 can be compared with FIG. 1. From this comparison it appears that the ratios of the intensities of the reflections of the crystal surfaces at right angles to the hexagonal c-axis of the crystals, to the intensities of the reflections of the other crystal surfaces are higher in FIG. 7 than in FIG. 1.

Furthermore, a cube was cut from this block, the values for the initial permeability of which were determined at 2 kcs./sec. in a calibrated ferrite yoke. In the direction of the direct field during the manufacture of the block, $\mu_0=4$, whereas in the directions at right angles thereto $\mu_0=55$.

*Example VII*

A mixture consisting of $Ba_3Co_2Fe_{24}O_{41}$, $Ba_2Zn_2Fe_{12}O_{22}$, $BaCO_3$ and $Fe_2O_3$ in a ratio of 0.25 molecule of $Ba_3Co_2Fe_{24}O_{41}$, 0.75 molecule of $Ba_2Zn_2Fe_{12}O_{22}$, 0.75 molecule of $BaCO_3$, 4.5 molecules of $Fe_2O_3$, which corresponds to the desired compound $Ba_3Zn_{1.5}Co_{0.5}Fe_{24}O_{41}$, was ground with alcohol in a shaking mill for 8 hours. $Ba_3Co_2Fe_{24}O_{41}$ and $Ba_2Zn_2Fe_{12}O_{22}$ are the directionable components of the initial mixture and the crystals of these compounds have a preferred plane of magnetization at right angles to the hexagonal c-axis. The ground product was suspended in acetone and a portion thereof was molded into a tablet at a pressure of about 0.3 ton/cm.$^2$ in a rotational field of about 1 revolution per second at right angles to the direction of molding. The rotational field had a constant field strength of 3800 oersteds. Subsequently, the tablet was after-molded at a pressure of about 1 ton/cm.$^2$ and then heated from room temperature to 500° C. within 1.5 hours, from 500° to 1250° C. within 5 hours, and heated in oxygen at 1250° C. for 16 hours. The reaction may be represented by the equation

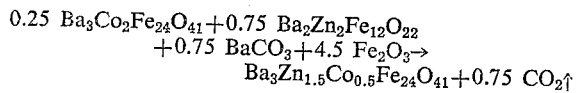

Figure 8:
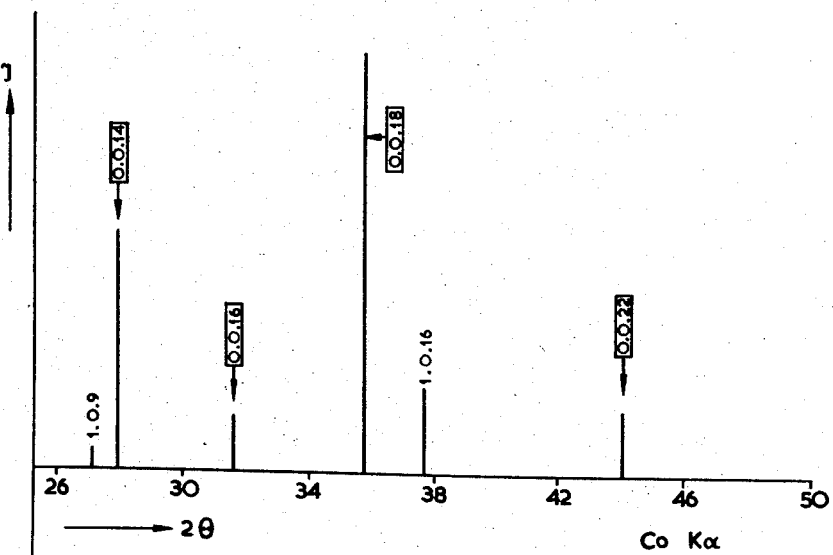

An X-ray diffractometer photograph taken of a surface of this tablet at right angles to the direction of molding is shown in FIG. 8. The crystal structure of the particles of which this body is built up is identical with that of the crystals of the compound $Ba_3Co_2Fe_{24}O_{41}$, so that FIG. 8 may be compared to FIG. 1. From this comparison it appears that the ratios of the intensities of the reflections of the crystal surfaces which are at right angles to the hexagonal c-axis of the crystals, to the intensities of the reflections of the other crystal surfaces are higher in FIG. 8 than in FIG. 1.

*Example VIII*

In a manner as described hereinafter, a tablet was manufactured from an initial mixture consisting of $Ba_3Co_2Fe_{24}O_{41}$, $Ba_2Zn_2Fe_{12}O_{22}$, $BaCO_3$ and $Fe_2O_3$ according to the equation

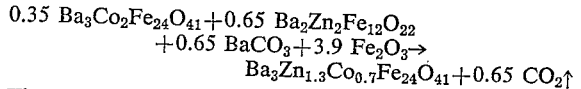

Figure 9:
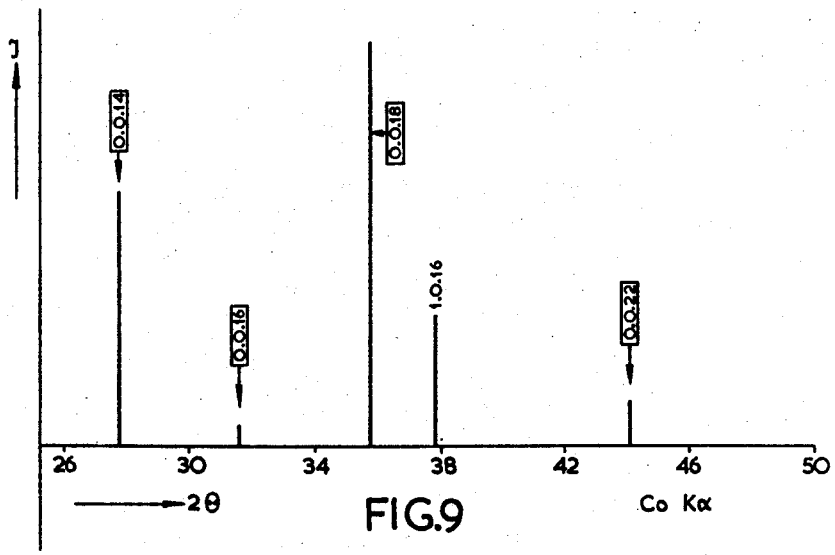

The mixture was ground with alcohol in a shaking mill for 8 hours. $Ba_3Co_2Fe_{24}O_{41}$ and $Ba_2Zn_2Fe_{12}O_{22}$ are the directionable components of the initial mixture and the crystals of these compounds have a preferred plane of magnetization at right angles to the hexagonal c-axis. The ground product was suspended in acetone and a portion thereof molded into a tablet at a pressure of 0.3 ton/cm.$^2$ in a rotational field of 50 revolutions per second at right angles to the direction of molding. The rotational field had a constant field strength of 3000 oersteds. Subsequently, the tablet was after-molded at a pressure of about 1 ton/cm.$^2$. The tablet was heated from room temperature to 1250° C. within 6 hours and heated in oxygen at 1250° C. for 3 hours. An X-ray diffractometer photograph taken of a surface of this tablet at right angles to the direction of molding is shown in FIG. 9. The crystal structure of the particles of which this body is built up is identical with that of the crystals of the compound $Ba_3Co_2Fe_{24}O_{41}$, so that FIG. 9 may be compared to FIG. 1. From this comparison it appears that the ratios of the intensities of the reflections of the crystal surfaces at right angles to the hexazonal c-axis of the crystals, to the intensities of the reflections of the other crystal surfaces are higher in FIG. 9 than in FIG. 1.

Furthermore, a cube was cut from this tablet, of which the values for the initial premeability were determined at 2 kcs./sec. in a calibrated ferrite yoke. In the direction of molding of the tablet, $\mu_0=10$, whereas in the directions at right angles thereto $\mu_0=23$ and $\mu_0=22.5$.

*Example IX*

Figure 10:
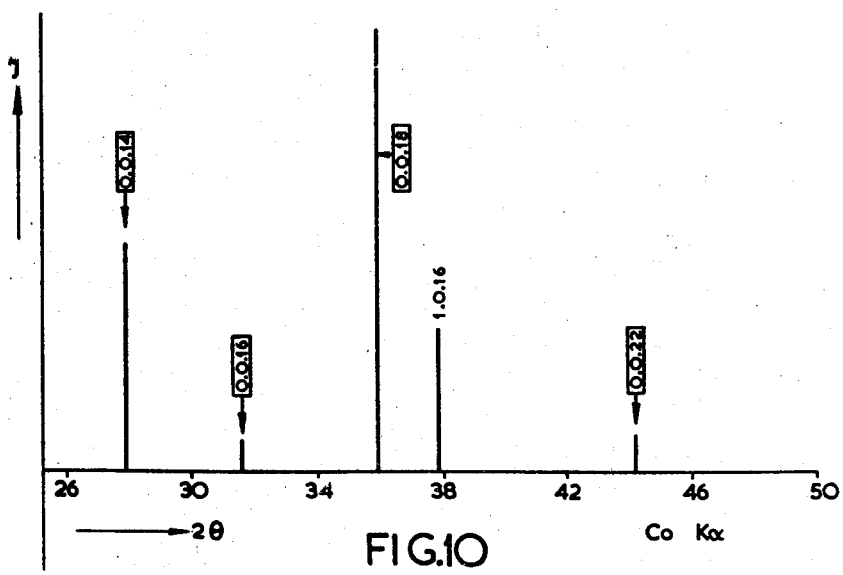

In the manner described in Example VIII, a tablet was manufactured from an initial mixture consisting of $Ba_3Co_2Fe_{24}O_{41}$, $Ba_2Zn_2Fe_{12}O_{22}$, $BaCO_3$ and $Fe_2O_3$ according to the equation $0.5\ Ba_3Co_2Fe_{24}O_{41} + 0.5\ Ba_2Zn_2Fe_{12}O_{22}$
$+ 0.5\ BaCO_3 + Fe_2O_3 \rightarrow$
$Ba_3ZnCoFe_{24}O_{41} + 0.5\ CO_2\uparrow$ $Ba_3Co_2Fe_{24}O_{41}$ and $Ba_2Zn_2Fe_{12}O_{22}$ are the directionable components of the initial mixture and the crystals of these compounds have a preferred plane of the magnetization at right angles to the hexagonal c-axis. The X-ray diffractometer photograph taken of a surface of this tablet at right angles to the direction of molding is shown in FIG. 10. The crystal structure of the particles of which this body is built up is identical with that of the crystals of the compound $Ba_3Co_2Fe_{24}O_{41}$, so that FIG. 10 may be compared to FIG. 1. From this comparison it appears that the ratios of the intensities of the reflections of the crystal surfaces at right angles to the hexagonal c-axis of the crystals, to the intensities of the reflections of the other crystal surfaces are higher in FIG. 10 than in FIG. 1.

Furthermore, a cube was cut from this tablet, of which the values for the initial permeability were determined at 2 kcs./sec. in a calibrated ferrite yoke. In the direction of molding of the tablet $\mu_0=4.5$ whereas in the directions at right angles thereto $\mu_0=33$ and $\mu_0=37.5$.

Example X

In the manner described in Example III, a small block was manufactured from an initial mixture consisting of $Ba_3Zn_2Fe_{24}O_{41}$, $BaCO_3$ and ZnO according to the equation.

$Ba_3Zn_2Fe_{24}O_{41} + BaCO_3 + 2\ ZnO \rightarrow 2\ Ba_2Zn_2Fe_{12}O_{22}$ $Ba_3Zn_2Fe_{24}O_{41}$ is the directionable component of the initial mixture and the crystals of this compound have a preferred direction of the magnetization parallel to the hexagonal c-axis. An X-ray diffractometer photograph (FIG. 12) was taken of a surface of this block which is at right angles to the direction of the direct field during molding.

For comparison purposes, an X-ray diffractometer photograph (FIG. 11) was taken of a surface of a body built up of the same crystals as the block but manufactured without the use of a directing process.

Figure 11:
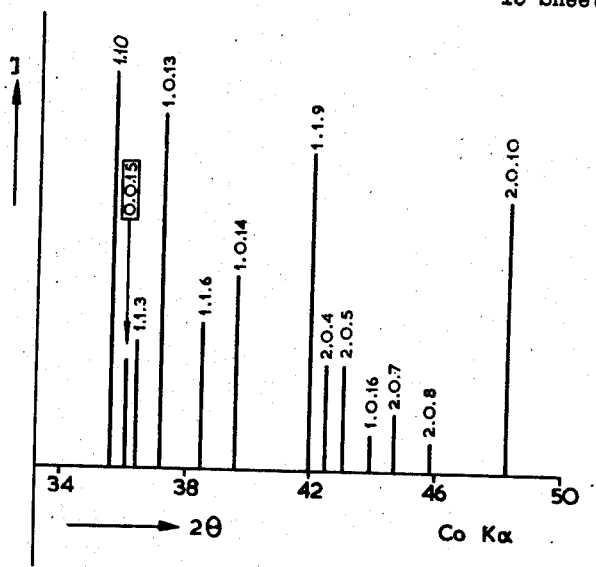
FIG. 11 is a similar diffractometer photograph of a body of another material made not in accordance with the invention and showing relative intensities of reflections of $CoK\alpha$ radiation from a surface of the body.
Figure 12:
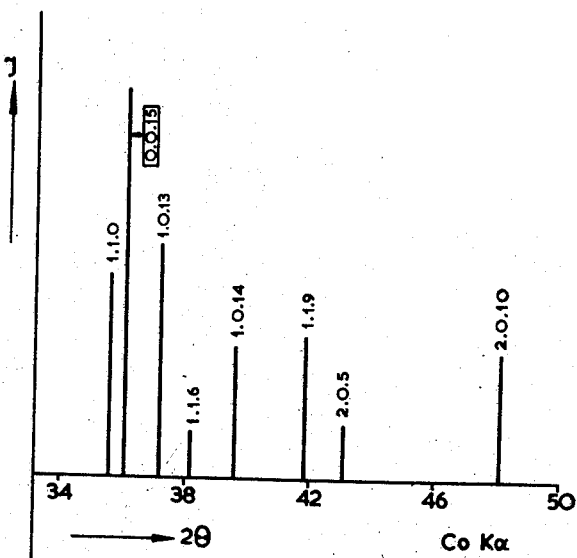
FIG. 12 is a similar diffractometer photograph taken under similar conditions of a body comparable with that used for making FIG. 11 but made in accordance with the invention.

A comparison between FIGS. 11 and 12 shows that the ratios of the intensities of the reflections of the crystal surfaces at right angles to the hexagonal c-axis of the crystals, to the intensities of the reflections of the other crystal surfaces are higher in FIG. 12 than in FIG. 11.

Example XI

In the manner described in Example IV, a tablet was manufactured from an initial mixture consisting of $BaFe_{12}O_{19}$, ZnO, $CoCO_3$ and $Fe_2O_3$ according to the equation $BaFe_{12}O_{19} + 1.4\ ZnO$
$+ 0.6\ CoCO_3 + 2\ Fe_2O_3 \rightarrow$
$BaCo_{0.6}Zn_{1.4}Fe_{16}O_{27} + 0.6\ CO_2\uparrow$ $BaFe_{12}O_{19}$ is the directionable component of the initial mixture and the crystals of this compound have a preferred direction of magnetization parallel to the hexagonal c-axis. An X-ray diffractometer photograph (FIG. 14) was taken of a surface of this tablet which is at right angles to the direction of molding.

For comparison purposes, an X-ray diffractometer photograph (FIG. 13) was taken of a surface of a body built up from crystals of the compound $BaFe_2^{++}Fe_{16}^{+++}O_{27}$ and manufactured without the use of a directing process. The particles of which this body is built up have the same crystal structure as the particles of the body manufactured by the method according to the invention so that comparison is justified.

A comparison of FIGS. 13 and 14 shows that the ratios of the intensities of the reflections of the crystal surfaces at right angles to the hexagonal c-axis of the crystals, to the intensities of the reflections of the other crystal surfaces are higher in FIG. 14 than in FIG. 13.

Example XII

In the manner described in Example III, a small block was manufactured from an initial mixture consisting of $BaFe_{12}O_{19}$, ZnO, $CoCO_3$ and $Fe_2O_3$ according to the equation $BaFe_{12}O_{19} + 1.2\ ZnO$
$+ 0.8\ CoCO_3 + 2\ Fe_2O_3 \rightarrow$
$BaCo_{0.8}Zn_{1.2}Fe_{16}O_{27} + 0.8\ CO_2\uparrow$ $BaFe_{12}O_{19}$ is the directionable component of the initial mixture and the crystals of this compound have a preferred direction of the magnetization parallel to the hexagonal c-axis. The X-ray diffractometer photograph taken of a surface of this block at right angles to the direction of the direct field during molding is shown in FIG. 15. The crystal structure of the particles of which this body is built up is identical with that of the crystals of the compound $BaFe_2^{++}Fe_{16}^{+++}O_{27}$, so that FIG. 15 may be compared to FIG. 13. From this comparison it appears that the ratios of the intensities of the reflections of the crystal surfaces at right angles to the hexagonal c-axis of the crystals, to the intensities of the reflections of the other crystal surfaces is higher in FIG. 15 than in FIG. 13.

Furthermore, a cube was cut from this block, of which the values for the initial permeability were determined at 2 kcs./sec. in a calibrated ferrite yoke. In the direction of the direct field during the manufacture of the block, $\mu_0=7$, whereas in the directions at right angles thereto $\mu_0=19$ and $\mu_0=20$.

Example XIII

Figure 16:
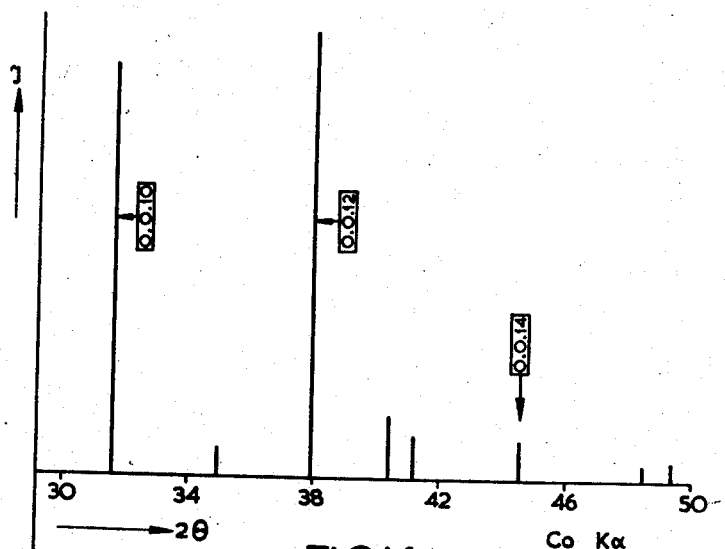

In the manner described in Example IV, a tablet was manufactured from an initial mixture consisting of $Ba_3Zn_2Fe_{24}O_{41}$, ZnO, $CoCO_3$ and $Fe_2O_3$ according to the equation $5\ Ba_3Zn_2Fe_{24}O_{41} + 11\ ZnO$
$+ 9\ CoCO_3 + 60\ Fe_2O_3 \rightarrow$
$16\ BaCo_{0.6}Zn_{1.4}Fe_{16}O_{27} + 9\ CO_2\uparrow$ $Ba_3Zn_2Fe_{24}O_{41}$ is the directionable component of the initial mixture and the crystals of this compound have a preferred direction of the magnetization parallel to the hexangonal c-axis. The X-ray diffractometer photograph taken of a surface of this tablet at right angles to the direction of molding is shown in FIG. 16. The crystal structure of the particles of which this body is built up is identical with that of the crystal of the compound $BaFe_2^{++}Fe_{16}^{+++}O_{27}$, so that FIG. 16 may be compared to FIG. 13. From this comparison it appears that the ratios of the intensities of the reflections of the crystal surfaces at right angles to the hexagonal c-axis of the crystals to the intensities of the reflections of the other crystal surfaces are higher in FIG. 16 than in FIG. 13.

Example XIV

Figure 17:
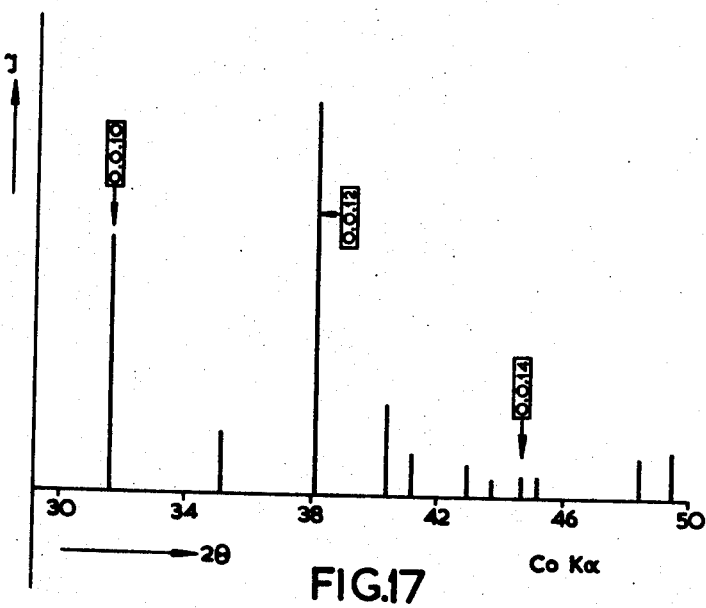

In the manner described in Example III, a small block was manufactured from an initial mixture consisting of $Ba_3Zn_2Fe_{24}O_{41}$, ZnO, $CoCO_3$ and $Fe_2O_3$ according to the equation $5\ Ba_3Zn_2Fe_{24}O_{41} + 8\ ZnO$
$+ 12\ CoCO_3 + 60\ Fe_2O_3 \rightarrow$
$15\ BaCo_{0.8}Zn_{1.2}Fe_{16}O_{27} + 12\ CO_2\uparrow$ $Ba_3Zn_2Fe_{24}O_{41}$ is the directionable component of the initial mixture and the crystals of this compound have a preferred direction of the magnetization parallel to the hexagonal c-axis. The X-ray diffractometer photograph taken of a surface of this tablet at right angles to the direction of the direct field during molding is shown in FIG. 17. The crystal structure of the particles of which this body is built up is identical with that of the crystals of the compound $BaFe_2^{++}Fe_{16}^{+++}O_{27}$, so that FIG. 17 may be compared to FIG. 13. From this comparison it appears that the ratios of the intensities of the reflections of the crystal surfaces at right angles to the hexagonal c-axis of the crystals, to the intensities of the reflections of the other crystal surfaces are higher in FIG. 17 than in FIG. 13.

Furthermore, a cube was cut from this small block, of which the values for the initial permeability were determined at 2 kcs./sec. in a calibrated ferrite yoke. In the direction of the direct field during the manufacture of the block, $\mu_0=10$, whereas in the directions at right angles thereto $\mu_0=20.5$ and $\mu_0=21.5$.

*Example XV*

In the manner described in Example VII, a tablet was manufactured from an initial mixture consisting of $Ba_3Co_2Fe_{24}O_{41}$, $ZnO$, $CoCO_3$ and $Fe_2O_3$ according to the equation $$10\ Ba_3Co_2Fe_{24}O_{41} + 39\ ZnO$$
$$+ CoCO_3 + 120\ Fe_2O_3 \rightarrow$$
$$30\ BaCo_{0.7}Zn_{1.3}Fe_{16}O_{27} + CO_2\uparrow$$

Figure 18:
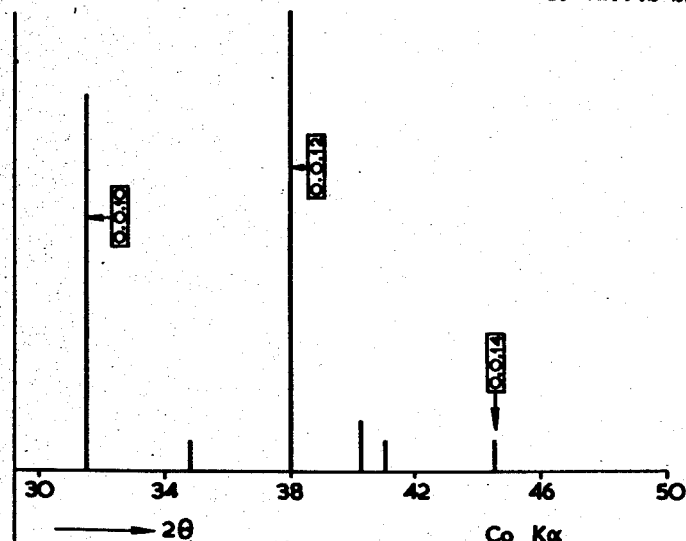

$Ba_3Co_2Fe_{24}O_{41}$ is the directionable component of the initial mixture and the crystals of this compound exhibit a preferred plane of magnetization at right angles to the hexagonal c-axis. The X-ray diffractometer photograph taken of a surface of this tablet at right angles to the direction of molding is shown in FIG. 18. The crystal structure of the particles of which this body is built up is identical with that of the crystals of the compound $BaFe_2^{++}Fe_{16}^{+++}O_{27}$, so that FIG. 18 may be compared to FIG. 13. From this comparison it appears that the ratios of the intensities of the reflections of the crystal surfaces at right angles to the hexagonal c-axis of the crystals, to the intensities of the reflections of the crystal surfaces are higher in FIG. 18 than in FIG. 13.

*Example XVI*

In the manner described in Example VIII, a tablet was manufactured from an initial mixture consisting of $Ba_3Co_2Fe_{24}O_{41}$, $ZnO$, $CoCO_3$, and $Fe_2O_3$ according to the equation $$5Ba_3Co_2Fe_{24}O_{41} + 18ZnO$$
$$+2CoCO_3 + 60Fe_2O_3 \rightarrow$$
$$15BaCo_{0.8}Zn_{1.2}Fe_{16}O_{27} + 2CO_2\uparrow$$

Figure 19:
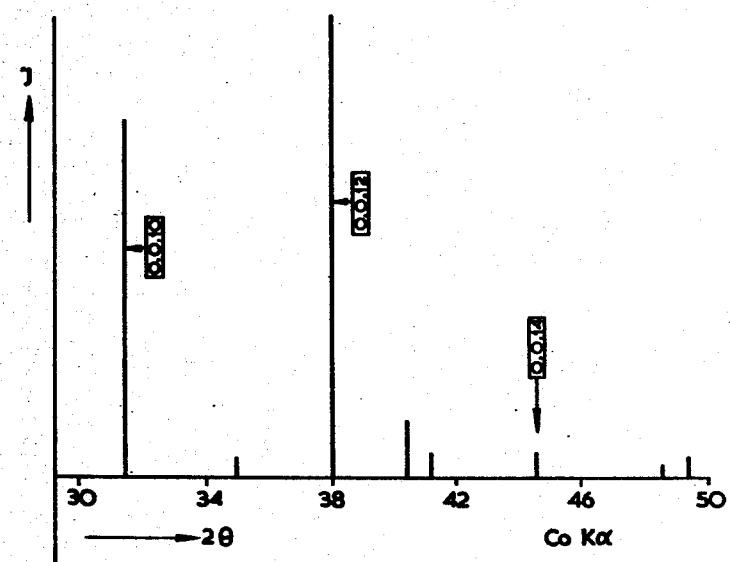

$Ba_3Co_2Fe_{24}O_{41}$ is the directionable component of the initial mixture and the crystals of this compound exhibit a preferred plane of magnetization at right angles to the hexagonal c-axis. The X-ray diffractometer photograph taken of a surface of this tablet at right angles to the direction of molding is shown in FIG. 19. The crystal structure of the particles of which this body is built up is identical with that of the crystals of the compound $BaFe_2^{++}Fe_{16}^{+++}O_{27}$, so that FIG. 19 may be compared to FIG. 13. From this comparison it appears that the ratios of the intensities of the reflections of the crystal surfaces at right angles to the hexagonal c-axis of the crystals to the intensities of the reflections of the other crystal surfaces are higher in FIG. 19 than in FIG. 13.

Furthermore, a cube was cut from this block, of which the values for the initial permeability were determined at 2 kcs./sec. in a calibrated ferrite yoke. In the direction of moulding of the tablet $\mu_0=5.5$ whereas in the directions at right angles thereto $\mu_0=18.5$.

*Example XVII*

In the manner described in Example IV, a tablet was manufactured from an initial mixture consisting of $BaFe_{12}O_{19}$, $BaCO_3$, $TiO_2$ and $CoCO_3$ according to the equation $$17BaFe_{12}O_{19} + 3BaCO_3$$
$$+18TiO_2 + 18CoCO_3 \rightarrow$$
$$20BaTi_{0.9}Co_{0.9}Fe_{10.2}O_{19} + 21CO_2\uparrow$$

$BaFe_{12}O_{19}$ is the directionable component of the initial mixture and the crystals of these compounds have a preferred direction of magnetization parallel to the hexagonal c-axis. An X-ray diffractometer photograph (FIG. 21) was taken of a surface of this tablet which is at right angles to the direction of molding.

For comparison purposes, an X-ray diffractometer photograph (FIG. 21) was taken of a surface of a body built up of crystals of the compound $BaFe_{12}O_{19}$ and manufactured without the use of a directing process. The particles of which this body is built up have the same crystal structure as those of the body manufactured by the method according to the invention, so that comparison is justified.

Figure 20:
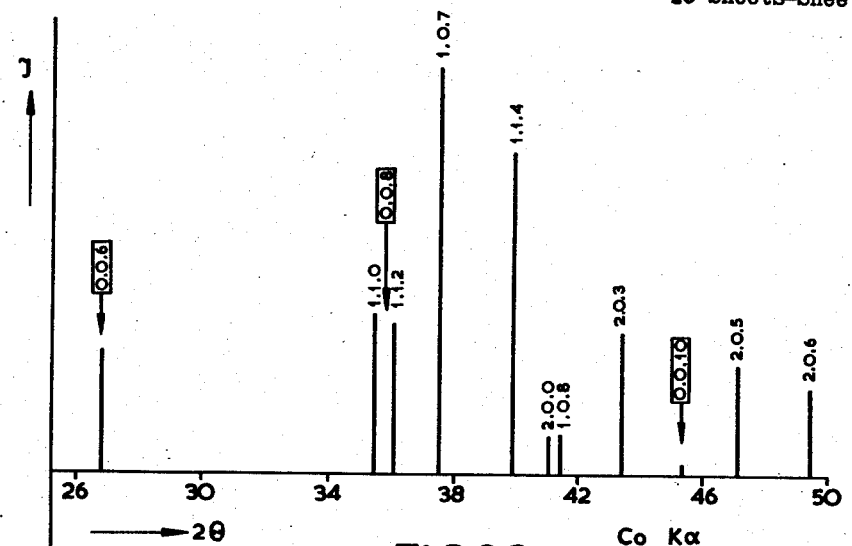
FIG. 20 is a diffractometer photograph of a body constituted of crystals of $BaFe_{12}O_{19}$ not made in accordance with the invention.
Figure 21:
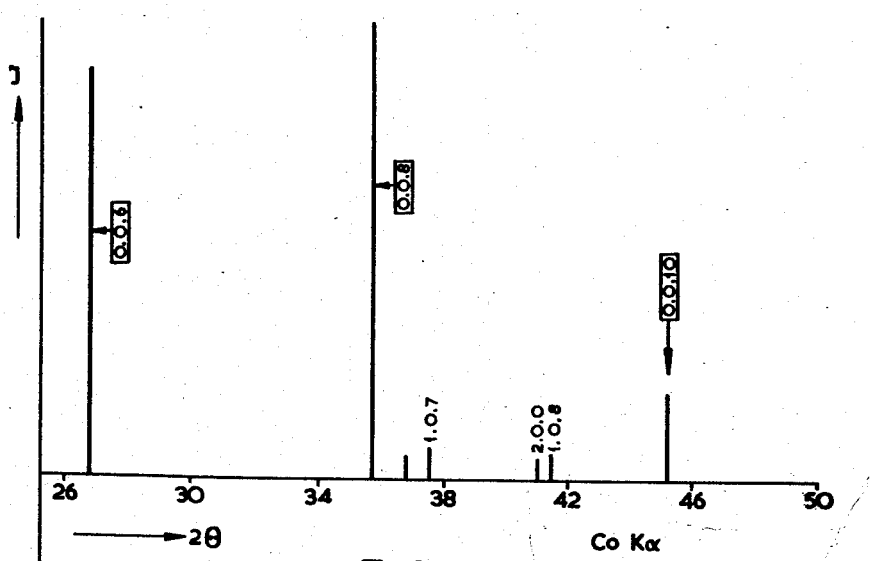

A comparison between FIGS. 20 and 21 shows that the ratios of the intensities of the reflections of the crystal surfaces at right angles to the hexagonal c-axis of the crystals, to the intensities of the reflections of the other crystal surfaces are higher in FIG. 21 than in FIG. 20.

*Example XVIII*

In the manner described in Example III, a small block was manufactured from an initial mixture consisting of $BaFe_{12}O_{19}$, $BaCO_3$, $TiO_2$ and $CoCO_3$ according to the equation $$49BaFe_{12}O_{19} + 11BaCO_3$$
$$+66TiO_2 + 66CoCO_3 \rightarrow$$
$$60BaTi_{1.1}Co_{1.1}Fe_{9.8}O_{19} + 77CO_2\uparrow$$

$BaFe_{12}O_{19}$ is the directionable component of the initial mixture and the crystals of this compound exhibit a preferred direction of the magnetization parallel to the hexagonal c-axis. The X-ray diffractometer photograph taken of a surface of this block at right angles to the direction of the direct field during molding is shown in FIG. 22. The crystal structure of the particles of which this body is built up is identical with that of the crystals of the compound $BaFe_{12}O_{19}$, so that FIG. 22 may be compared to FIG. 20. From this comparison it appears that the ratios of the intensities of the reflections of the crystal surfaces at right angles to the hexagonal c-axis of the crystals, to the intensities of the reflections of the other crystal surfaces are higher in FIG. 22 than in FIG. 20.

Furthermore, a cube was cut from the block, of which the values for the initial permeability were determined at 2 kcs./sec. in a calibrated ferrite yoke. In the direction of the direct field during the manufacture of the block, $\mu_0=10$, whereas in the directions at right angles thereto $\mu_0=62$ and $\mu_0=64$.

*Example XIX*

In the manner described in Example III, a small block was manufactured from an initial mixture consisting of $BaFe_{12}O_{19}$, $BaCO_3$, $TiO_2$ and $CoCO_3$ according to the equation $$3BaFe_{12}O_{19} + BaCO_3 + 6TiO_2 + 6CoCO_3 \rightarrow$$
$$4BaTi_{1.5}Co_{1.5}Fe_9O_{19} + 7CO_2\uparrow$$

$BaFe_{12}O_{19}$ is the directionable component of the initial mixture and the crystals of this compound exhibit a preferred direction of the magnetization parallel to the hexagonal c-axis. The X-ray diffractometer photograph taken of a surface of this block at right angles to the direction of the direct field during molding is shown in FIG. 23. The crystal structure of the particles of which this body is built up is identical with that of the crystals of the compound $BaFe_{12}O_{19}$, so that FIG. 23 may be compared to FIG. 20. From this comparison it appears that the ratios of the intensities of the reflections of the crystal surfaces at right angles to the hexagonal c-axis of the crystals, to the intensities of the reflections of the other crystal surfaces are higher in FIG. 23 than in FIG. 20.

Example XX

In the manner described in Example I, a small block is manufactured from an initial mixture consisting of $BaTiFe^{++}Fe_{10}^{+++}O_{19}$, $BaCO_3$, $TiO_2$ and $CoCO_3$ according to the equation $$10BaTiFe^{++}Fe_{10}^{+++}O_{19}+BaCO_3$$
$$+TiO_2+11CoCO_3+2.5O_2 \rightarrow$$
$$11BaTiCoFe_{10}O_{19}+12CO_2\uparrow$$

$BaTiFe^{++}Fe_{10}^{+++}O_{19}$ is the directionable component of the initial mixture and the crystals of this compound exhibit a preferred direction of the magnetization parallel to the hexagonal c-axis. The X-ray diffractometer photograph taken of a surface of this block at right angles to the direction of the direct field during molding is shown in FIG. 24. The crystal structure of the particles of which this body is built up is identical with that of the crystals of the compound $BaFe_{12}O_{19}$, so that FIG. 24 may be compared to FIG. 20. From this comparison it appears that the ratios of the intensities of the reflections of the crystal surfaces at right angles to the hexagonal c-axis of the crystals, to the intensities of the reflections of the other crystal surfaces are higher in FIG. 24 than in FIG. 20.

Example XXI

A mixture consisting of $BaCo_2Fe_{16}O_{27}$ and $CoCO_3$ in a ratio of 1 mol of $BaCo_2Fe_{16}O_{27}$ and 5 mols of $CoCO_3$ was ground with alcohol in a shaking mill for 8 hours. $BaCo_2Fe_{16}O_{27}$ of the initial mixture is the directionable component and the crystals of this compound have a preferred plane of magnetization at right angles to the hexagonal c-axis. The ground product was suspended in acetone and a portion thereof was moulded into a tablet at a pressure of about 0.3 ton/cm.² in a rotational field of 50 revolutions per second, which was at right angles to the direction of molding. The rotational field had a constant field strength of 3000 oersted. The tablet was heated up from room temperature to 1250° C. within 16 hours and then heated at 1250° C. in a flow of oxygen for 2 hours. The reaction may be represented by the equation $$BaCo_2Fe_{16}O_{27}+5CoCO_3 \rightarrow$$
$$7CoFe_2O_4+BaFe_2O_4+5CO_2\uparrow$$

An X-ray diffractometer photograph (FIG. 25) was taken of a surface of this tablet at right angles to the direction of molding.

For comparison purposes, an X-ray diffractometer photograph (FIG. 26) was taken of a surface of a body manufactured of a portion of the initial mixture without the use of a directing process.

Figure 25:
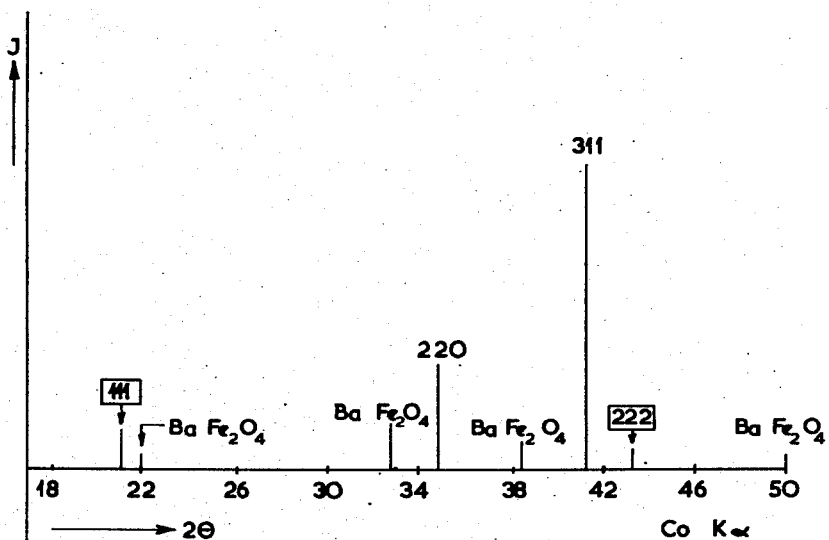
FIG. 25 is a diffractometer photograph of a surface of a body constituted of another ferromagnetic material of known composition and crystal structure but not made in accordance with the invention.
Figure 26:
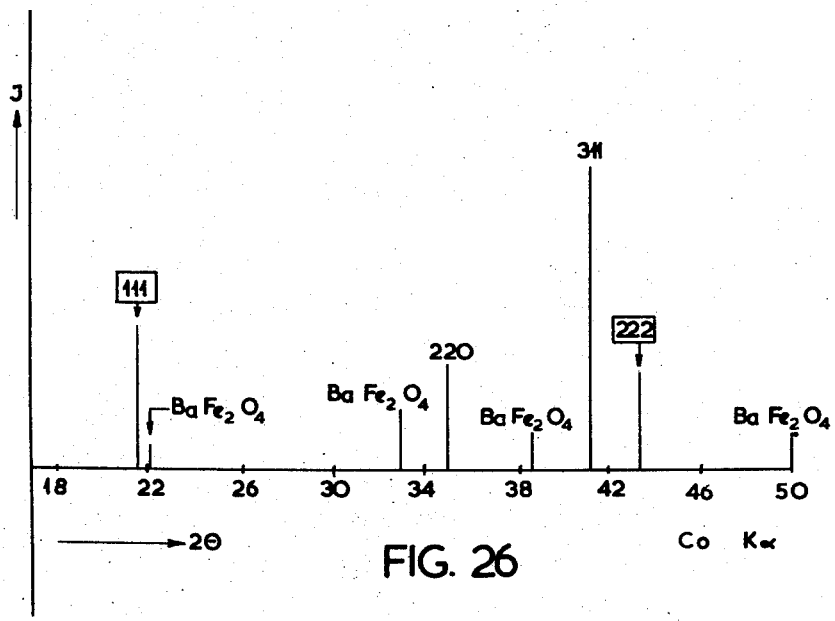

When FIGS. 25 and 26 are compared, it appears that the ratios of the intensities of the reflections on the crystal surfaces which are at right angles to a cube diagonal of the crystals, to the intensities of the reflections on the other crystal surfaces are higher in FIG. 26 than in FIG. 25. The X-ray diffractometer photographs naturally also show the reflections on the crystal surfaces of the $BaFe_2O_4$ which is present as a contamination.

Upon determining the magnetic anisotropy, it appears that in the first tablet, the preferred directions of the magnetization form a conical envelope having an angular aperture of about 110°, whereas the second tablet, apart from the shape, is magnetically isotropic.

Example XXII

A mixture consisting of $CoFe_2O_4$, $ZnO$ and $Fe_2O_3$ in a ratio of 0.67 mol of $CoFe_2O_4$, 0.33 mol of ZnO and 0.33 mol of $Fe_2O_3$, which corresponds to the desired compound $Co_{0.67}Zn_{0.33}Fe_2O_4$, was ground with alcohol in a shaking mill for ½ hour. $CoFe_2O_4$ of the initial mixture is the directionable component and the crystals of this compound have a preferred direction of magnetization parallel to the axis of a cube. The ground product was suspended in acetone and a portion thereof was molded into a tablet at a pressure of about 1 ton/cm.² in a direct field having a constant field strength of 8000 oersteds parallel to the direction of molding. The tablet was heated up from room temperature to 1000° C. within ½ hour, then heated at 1000° C. for 1 hour, next heated up from 1000° C. to 1300° C. within ¼ hour and finally heated at 1300° C. for 2 hours, all this in a flow of oxygen. The reaction may be represented by the equation $$0.67\ CoFe_2O_4+0.33\ ZnO+0.33\ Fe_2O_3 \rightarrow Co_{0.67}Zn_{0.33}Fe_2O_4$$

An X-ray diffractometer photograph (FIG. 28) was taken of a surface of this tablet at right angles to the direction of molding.

For comparison purposes, an X-ray diffractometer photograph (FIG. 27) was taken of a surface of a body built up of the same crystals as the tablet, but which was manufactured without the use of a directing process.

Figure 27:
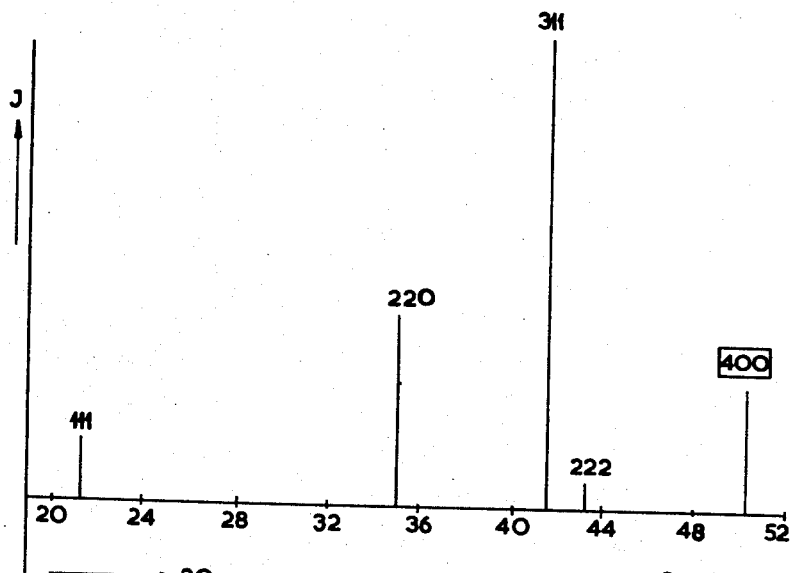
FIG. 27 is a diffractometer photograph of a surface of a body constituted of another ferromagnetic material of known composition and crystal structure but not made in accordance with the invention.
Figure 28:
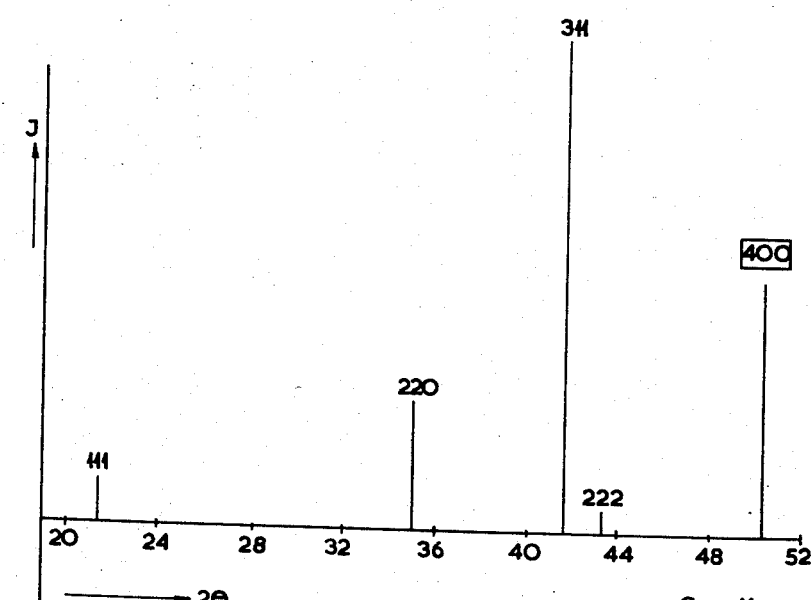

Upon comparison of FIGS. 27 and 28, it appears that the ratios of the intensities of the reflections of the crystal surfaces which are at right angles to a cube axis of the crystals, to the intensities of the reflections on the other crystal surfaces are higher in FIG. 28 than in FIG. 27.

While we have described our invention in connection with specific embodiments and applications, other modifications thereof will be readily apparent to those skilled in this art without departing from the spirit and scope of the invention as defined in the appended claims.

We claim:

1. A method of manufacturing a soft magnetically anisotropic ferromagnetic body comprising the steps, forming in finely-divided form a mixture of oxidic components forming upon sintering a ferromagnetic body having a composition corresponding to about 8–21 mol percent of AO, about 5–21 mol percent of MeO, and about 58–83 mol percent of $Fe_2O_3$, A being a bivalent metal selected from the group consisting of barium, strontium, lead and calcium, and Me being a bivalent ion selected from the group consisting of $Fe^{++}$, $Mn^{++}$, $Co^{++}$, $Ni^{++}$, $Zn^{++}$, $Mg^{++}$, $Cu^{++}$, and $$\frac{Li^+ + Fe^{+++}}{2}$$

at least one of said components being ferromagnetic and capable of being magnetically oriented, magnetically orienting said latter component in said mixture while in a mobile condition, and sintering said mixture at about 1100° C. to 1400° C. under non-reducing conditions to form a magnetically anisotropic body having said composition.

2. A method of manufacturing a soft magnetically anisotropic ferromagnetic body comprising the steps, forming in finely-divided form a mixture of oxidic components forming upon sintering a ferromagnetic body having a composition correspondnig to $AMe_2Fe_{16}O_{27}$, A representing up to ⅔ part $Ca^{++}$ and the balance a bivalent metal ion selected from the group consisting of $Ba^{++}$, $Sr^{++}$, and $Pb^{++}$, Me being a bivalent ion selected from the group consisting of $Fe^{++}$, $Mn^{++}$, $Co^{++}$, $Ni^{++}$, $Zn^{++}$, $Mg^{++}$, and $$\frac{Li^+ + Fe^{+++}}{2}$$

at least one of said components being ferromagnetic and capable of being magnetically oriented, magnetically orienting said latter component in said mixture while in a mobile condition, and sintering said mixture at about 1100° C. to 1400° C. under non-reducing conditions to form a magnetically anisotropic body having said composition.

3. A method of manufacturing a soft magnetically anisotropic ferromagnetic body comprising the steps, forming in finely-divided form a mixture of oxidic components forming upon sintering a ferromagnetic body having a composition corresponding to $A_3Me_2Fe_{24}O_{41}$, in which A represents up to 1/3 part Sr++, up to 1/5 part Pb++, up to 1/10 part Ca++, and the balance Ba++ and Me represents an ion selected from the group consisting of Fe++, Mn++, Co++, Ni++, Zn++, Mg++, Cu++, and

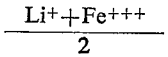

at least one of said components being ferromagnetic and capable of being magnetically oriented, magnetically orienting said latter component in said mixture while in a mobile condition, and sintering said mixture at about 1100° C. to 1400° C. under non-reducing conditions to form a magnetically anisotropic body having said composition.

4. A method of manufacturing a soft magnetically anisotropic ferromagnetic body comprising the steps, forming in finely-divided form a mixture of oxidic components forming upon sintering a ferromagnetic body having a composition corresponing to $A_2Me_2Fe_{12}O_{22}$, A representing up to one-half part Sr++, up to 1/4 part Pb++, up to 1/4 part Ca++, and the balance Ba++, and Me is a bivalent ion selected from the group consisting of Fe++, Mn++, Co++, Ni++, Zn++, Mg++, and Cu++, at least one of said components being ferromagnetic and capable of being magnetically oriented, magnetically orienting said latter component in said mixture, while in a mobile condition, and sintering said mixture at about 1100° C. to 1400° C. under non-reducing conditions to form a magnetically anisotropic body having said composition.

5. A method of manufacturing a soft magnetically anisotropic ferromagnetic body comprising the steps, forming in finely-divided form a mixture of oxidic components forming upon sintering a ferromagnetic body having a composition corresponding to $A_4Me_2Fe_{36}O_{60}$, A representing up to 1/3 part Sr++, up to 1/5 part Pb++, up to 1/10 part Ca++, and the balance Ba++, and Me representing up to 9/10 part of a bivalent ion selected from the group consisting of Cu++ and Mn++ and the balance a bivalent ion selected from the group consisting of Fe++, Co++, Ni++, Zn++, and Mg++, at least one of said components being ferromagnetic and capable of being magnetically oriented, magnetically orienting said latter component in said component in said mixture while in a mobile condition, and sintering said mixture at about 1100° C. to 1400° C. under non-reducing conditions to form a magnetically anistropic body having said composition.

6. A method of manufacturing a soft magnetically anisotropic ferromagnetic body comprising the steps, forming in finely-divided form a mixture of oxidic components forming upon sintering a ferromagnetic body having a composition corresponding to $A_2Me_2Fe_{28}O_{46}$, A representing up to 2/5 part Cu++ and the balance a bivalent metal ion selected from the group consisting of Ba++, Sr++, and Pb++, and Me represents a bivalent ion selected from the group consisting of Fe++, Mn++, Co++, Ni++, Zn++, Mg++, and

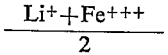

at least one of said components being ferromagnetic and capable of being magnetically oriented, magnetically orienting said latter component in said mixture while in a mobile condition, and sintering said mixture at about 1100° C. to 1400° C. under non-reducing conditions to form a magnetically anisotropic body having said composition.

7. A method of manufacturing a soft magnetically anisotropic ferromagnetic body comprising the steps, forming in finely-divided form a mixture of oxidic components forming unpon sintering a ferromagnetic body having a composition corresponding to

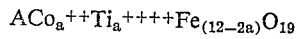

A representing up to 2/5 part Ca++ and the balance a bivalent ion selected from the group consisting of Ba++, Sr++, and Pb++, and $a$ having a value between 1.0 and 1.6, at least one of said components being ferromagnetic and capable of being magnetically oriented, magnetically orienting said latter component in said mixture while in a mobile condition, and sintering said mixture at 1100° C. to 1400° C. under non-reducing conditions to form a magnetically anisotropic body having said composition.

8. A method of manufacturing a soft magnetically anisotropic ferromagnetic body comprising the steps, forming in finely-divided form a mixture of oxidic components forming upon sintering a ferromagnetic body having a composition corresponding to $MeFe_2O_4$, Me representing at least one bivalent ion selected from the group consisting of Fe++, Mn++, Co++, Ni++, Zn++, Mg++, Cu++, and

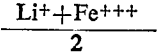

at least one of said components being ferromagnetic and capable of being magnetically oriented, magnetically orienting said latter component in said mixture while in a mobile condition, and sintering said mixture at about 1100° C. to 1400° C. under non-reducing conditions to form a magnetically anisotropic body having said composition.

9. A method of manufacturing a soft magnetically anisotropic ferromagnetic body comprising the steps, forming in finely-divided form a mixture of oxidic components forming upon sintering a ferromagnetic body, at least one of said components being ferromagnetic and capable of being magnetically oriented, said component having a composition corresponding to $CoFe_2O_4$, magnetically orienting said latter component in said mixture while in a mobile condition and sintering said mixture at about 1100° C. to 1400° C. under non-reducing conditions to form a magnetically anisotropic body having said composition.

10. A soft magnetically anisotropic ferromagnetic body consisting essentially of a body having a composition corresponding to $AMe_2Fe_{16}O_{27}$, A representing up to 2/5 part Ca++ and the balance an ion selected from the group consisting of Ba++, Sr++, and Pb++, and Me representing a bivalent ion selected from the group consisting of Fe++, Mn++, Co++, Ni++, Zn++, Mg++, and

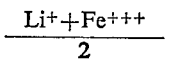

said body being made in accordance with the method defined in claim 2.

11. A soft magnetically anisotropic ferromagnetic body consisting essentially of a body having a composition corresponding to $A_3Me_2Fe_{24}O_{41}$, A representing up to 1/3 part Sr++, up to 1/5 part Pb++, up to 1/10 part Ca++, and the balance Ba++, and Me representing an ion selected from the group consisting of Fe++, Mn++, Co++, Ni++, Zn++, Mg++, Cu++, and

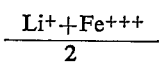

said body being made in accordance with the method defined in claim 3.

12. A soft magnetically anisotropic ferromagnetic body consisting essentially of a body having a composition corresponding to $A_2Me_2Fe_{12}O_{22}$, A representing up to 1/2 part Sr++, up to 1/4 part Pb++, up to 1/4 part Ca++, and the balance Ba++, and Me represents a bivalent ion selected from the group consisting of Fe++, Mn++, Co++, Ni++, Mg++, and Cu++, said body being made in accordance with the method defined in claim 4.

13. A soft magnetically anisotropic ferromagnetic body consisting essentially of a body having a composition corresponding to $A_4Me_2Fe_{36}O_{60}$, A representing up to 1/3 part Sr++, up to 1/5 part Pb++, up to 1/10 part Ca++, and balance Ba++, and Me represents up to 9/10 part of a bivalent ion selected from the group consisting of Cu++ and Mn++, and the balance a bivalent ion selected from the group consisting of Fe++, Co++, Ni++, Zn++, and Mg++, said body being made in accordance with the method defined in claim 5.

14. A soft magnetically anisotropic ferromagnetic body consisting essentially of a body having a composition corresponding to $A_2Me_2Fe_{28}O_{46}$, A representing up to ⅔ part Ca++ and the balance a bivalent ion selected from the group consisting of Ba++, Sr++, and Pb++, and Me represents a bivalent ion selected from the group consisting of Fe++, Mn++, Co++, Ni++, Zn++, Mg++, and $$\frac{Li^+ + Fe^{+++}}{2}$$

said body being made in accordance with the method defined in claim 6.

15. A soft magnetically anisotropic ferromagnetic body consisting essentially of a body having a composition corresponding to $ACo_a^{++}Ti_a^{++++}Fe_{(12-2a)}O_{19}$, A representing up to ⅔ part Ca++ and the balance a bivalent ion selected from the group consisting of Ba++, Sr++, and Pb++, and $a$ having a value between 1.0 and 1.6, said body being made in accordance with the method defined in claim 7.

16. A soft magnetically anisotropic ferromagnetic body consisting essentially of a body having a composition corresponding to $MeFe_2O_4$, Me representing at least one bivalent ion selected from the group consisting of Fe++, Mn++, Co++, Ni++, Zn++, Mg++, Cu++, and $$\frac{Li^+ + Fe^{+++}}{2}$$

said body being made in accordance with the method defined in claim 8.

17. A ferromagnetic body as defined in claim 16 in which Me includes Co++.

References Cited in the file of this patent

UNITED STATES PATENTS

| 2,762,777 | Went et al. | Sept. 11, 1956 |
| 2,762,778 | Gorter et al. | Sept. 11, 1956 |
| 2,827,437 | Rathenau | Mar. 18, 1958 |
| 2,837,483 | Hakker et al. | June 3, 1958 |
| 2,847,101 | Bergmann | Aug. 12, 1958 |

FOREIGN PATENTS

| 557,552 | Italy | Feb. 18, 1957 |
| 557,553 | Italy | Feb. 18, 1957 |
| 557,554 | Italy | Feb. 18, 1957 |
| 1,086,346 | France | Aug. 11, 1954 |
| 1,110,334 | France | Oct. 12, 1955 |
| 1,110,819 | France | Oct. 19, 1955 |
| 765,464 | Great Britain | Jan. 9, 1957 |

OTHER REFERENCES

Stuijts et al.: Philips Tech. Review, vol. 19, 1957–58, Feb. 10, 1958, pages 209–217.

Kordes et al.: Chem. Abstracts, vol. 46, col. 4411, May 25, 1952.

Gorter: Philips Res. Reports, December 1954, pages 403–404.

Bozorth: Physical Review, Sept. 15, 1955, page 1792.

Weil: Comptes Rendus, Mar. 24, 1952, pages 1351–1352.

Economos: J. Amer. Ceramic Soc., July 1955, page 242.

J. of the Inst. of Elect. Engineers of Japan, November 1937, pages 4, 5, 7.

UNITED STATES PATENT OFFICE
CERTIFICATE OF CORRECTION

Patent No. 3,072,575

January 8, 1963

Evert Willem Gorter et al.

It is hereby certified that error appears in the above numbered patent requiring correction and that the said Letters Patent should read as corrected below.

Column 5, line 17, for "constituting" read -- consisting --; column 7, line 50, for "magnetizaiton" read -- magnetization --; column 8, line 61, for "hexazonal" read -- hexagonal --; column 15, lines 42 and 43, strike out "in said component"; line 70, for "unpon" read -- upon --.

Signed and sealed this 24th day of September 1963.

(SEAL)

Attest:

ERNEST W. SWIDER
Attesting Officer

DAVID L. LADD
Commissioner of Patents